(12) United States Patent
Park et al.

(10) Patent No.: US 12,296,816 B2
(45) Date of Patent: May 13, 2025

(54) EMERGENCY OPERATING SYSTEM AND METHOD FOR HYBRID VEHICLE WITH DAMAGED BEARING OF ENGINE

(71) Applicants: Hyundai Motor Company, Seoul (KR); Kia Corporation, Seoul (KR)

(72) Inventors: Jun-Ho Park, Seoul (KR); Sung-Woo Nam, Gunpo-si (KR); Pan-Sang Kim, Seoul (KR); Byng-Mo Jeon, Hwaseong-si (KR); Sang-Hyuk Mun, Hwaseong-si (KR); Seong-Wook Moon, Seoul (KR); Je-Ha Son, Suwon-si (KR); Young-Joon Park, Yongin-si (KR); Chan-Ki Min, Hwaseong-si (KR); Hye-Kil Hwang, Suwon-si (KR); Sung-Nam Baek, Seoul (KR); Chul-Ho Yu, Seoul (KR); Hyung-Mook Yoon, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 527 days.

(21) Appl. No.: 17/710,140

(22) Filed: Mar. 31, 2022

(65) Prior Publication Data
US 2022/0388496 A1 Dec. 8, 2022

(30) Foreign Application Priority Data
Jun. 3, 2021 (KR) .................. 10-2021-0072008

(51) Int. Cl.
*B60W 20/50* (2016.01)
*B60K 6/26* (2007.10)
(Continued)

(52) U.S. Cl.
CPC ............ *B60W 20/50* (2013.01); *B60W 10/02* (2013.01); *B60W 10/06* (2013.01); *B60W 10/08* (2013.01);
(Continued)

(58) Field of Classification Search
CPC ...... B60W 20/50; B60W 10/02; B60W 10/06; B60W 10/08; B60W 2510/1005;
(Continued)

(56) References Cited

U.S. PATENT DOCUMENTS

| 10,598,091 B2 | 3/2020 | Jeong et al. | |
| 2010/0056327 A1* | 3/2010 | Hofbauer | B60K 6/48 |
| | | | 192/30 R |

(Continued)

FOREIGN PATENT DOCUMENTS

| CN | 206856484 U | * | 1/2018 | |
| CN | 110864900 A | * | 3/2020 | .......... F16C 32/0442 |

(Continued)

OTHER PUBLICATIONS

English translation of CN-110864900-A (Year: 2024).*
English translation of CN-206856484-U (Year: 2024).*

*Primary Examiner* — Jess Whittington
*Assistant Examiner* — Shahira Baajour
(74) *Attorney, Agent, or Firm* — Morgan, Lewis & Bockius LLP

(57) ABSTRACT

Disclosed herein are an emergency operating system and an emergency operating method for a hybrid vehicle with a damaged bearing of an engine, which are capable of preventing a bearing from being further damaged due to a drive motor and a hybrid starter and generator (HSG) when damage to the bearing installed in an engine is detected and capable of driving the hybrid vehicle and which include a bearing damage detection operation, an engine driving (Continued)

maintaining operation, a first state of charge (SOC) comparison operation, and a first emergency operating operation.

24 Claims, 2 Drawing Sheets

(51) Int. Cl.
*B60W 10/02* (2006.01)
*B60W 10/06* (2006.01)
*B60W 10/08* (2006.01)

(52) U.S. Cl.
CPC .......... *B60K 6/26* (2013.01); *B60K 2006/268* (2013.01); *B60W 2510/1005* (2013.01); *B60W 2510/244* (2013.01); *B60W 2520/04* (2013.01); *B60W 2710/021* (2013.01); *B60W 2710/06* (2013.01); *B60W 2710/08* (2013.01); *B60Y 2200/92* (2013.01)

(58) Field of Classification Search
CPC ....... B60W 2510/244; B60W 2520/04; B60W 2710/021; B60W 2710/06; B60W 2710/08; B60W 20/20; B60W 50/0205; B60W 20/13; B60W 20/15; B60W 20/40; B60W 30/18063; B60W 30/186; B60W 50/029; B60W 2400/00; B60W 2510/06; B60W 2710/02; B60W 10/10; B60W 30/18054; B60K 6/26; B60K 2006/268; B60K 2006/4825; B60K 6/442; B60Y 2200/92; B60Y 2300/1805; Y02T 10/62; F16C 9/00

See application file for complete search history.

(56) References Cited

U.S. PATENT DOCUMENTS

| | | | |
|---|---|---|---|
| 2014/0297138 A1* | 10/2014 | Hwang | F16H 61/0025 |
| | | | 701/53 |
| 2014/0324261 A1* | 10/2014 | Amano | B60L 50/61 |
| | | | 701/22 |
| 2015/0006007 A1* | 1/2015 | Kitahata | B60W 10/10 |
| | | | 180/65.265 |
| 2016/0230736 A1* | 8/2016 | Hosaka | F02N 11/103 |
| 2017/0113679 A1* | 4/2017 | Hata | B60W 10/02 |
| 2020/0031233 A1* | 1/2020 | Campbell | B60L 3/003 |
| 2020/0063668 A1 | 2/2020 | Jeong et al. | |

FOREIGN PATENT DOCUMENTS

| | | |
|---|---|---|
| KR | 10-1776768 B1 | 9/2017 |
| KR | 10-2019-0073935 A | 6/2019 |
| KR | 10-2020-0023962 A | 3/2020 |
| KR | 10-2097944 B1 | 4/2020 |

* cited by examiner

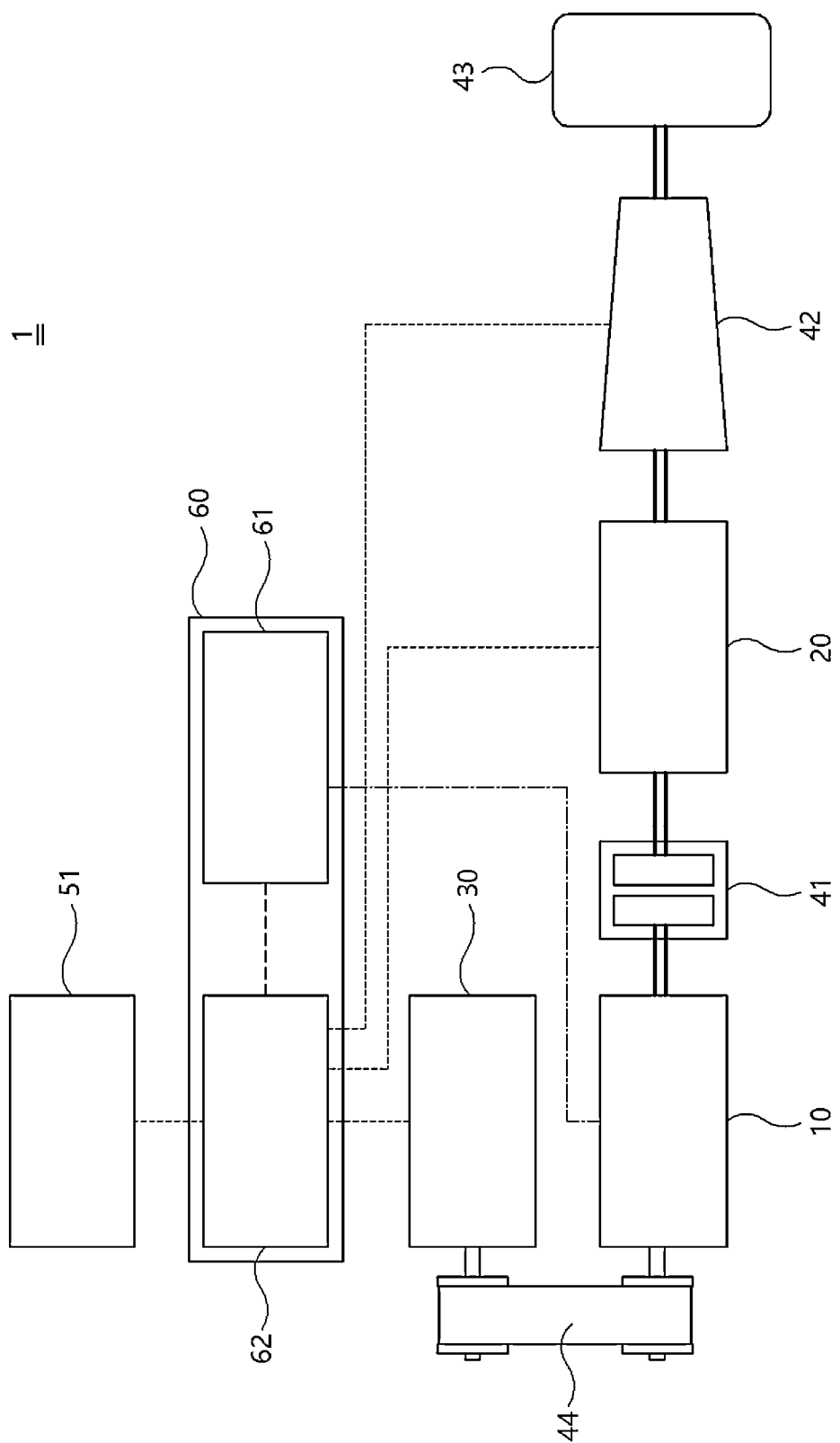

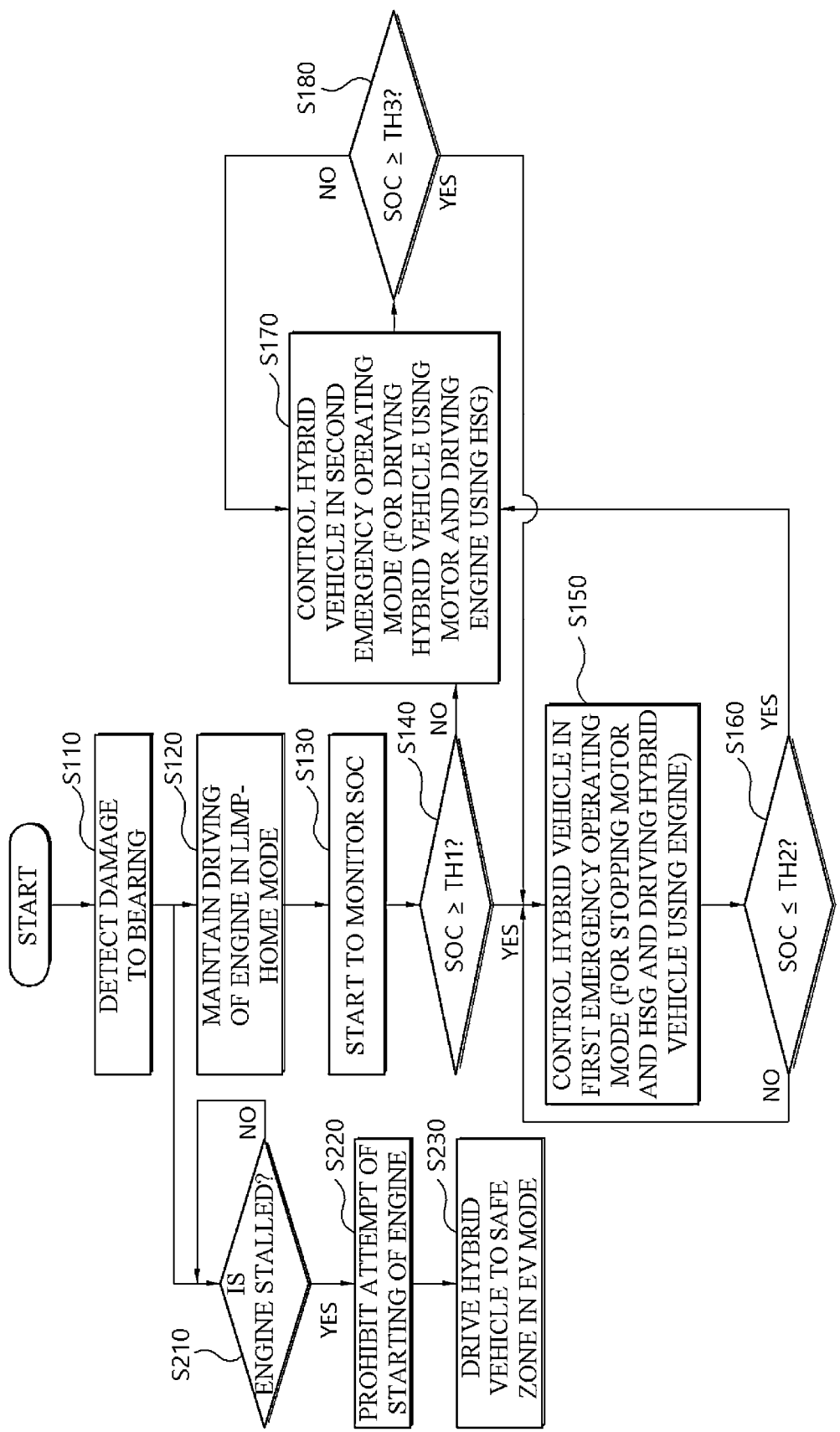

EMERGENCY OPERATING SYSTEM AND METHOD FOR HYBRID VEHICLE WITH DAMAGED BEARING OF ENGINE

CROSS-REFERENCE(S) TO RELATED APPLICATIONS

This application claims priority to Korean Patent Application No. 10-2021-0072008, filed on Jun. 3, 2021, which is incorporated herein by reference in its entirety.

BACKGROUND OF PRESENT DISCLOSURE

Field of Present Disclosure

Exemplary embodiments of the present disclosure relate to a hybrid vehicle using at least one of an engine and a drive motor as a driving source, and more particularly, to an emergency operating system and an emergency operating method for a hybrid vehicle with a damaged bearing of an engine, which are capable of preventing a bearing from being further damaged due to a drive motor and a hybrid starter and generator (HSG) when damage to the bearing installed in an engine is detected and capable of driving the hybrid vehicle.

Description of Related Art

A hybrid vehicle is equipped with both an engine and a drive motor and, according to a driving environment, uses either the engine or the drive motor as a driving source or simultaneously operates the engine and the drive motor to serve as driving sources.

Since the hybrid vehicle is equipped with the engine, a failure occurring in an engine mounted in an internal combustion engine vehicle may occur in the hybrid vehicle. For example, in the internal combustion engine vehicle, a connecting rod bearing, which is a bearing installed to reduce friction at a portion in which a connecting rod for connecting a piston to a crankshaft is connected to a crankshaft, may be damaged. In the internal combustion engine vehicle, damage to the connecting rod bearing is detected by monitoring a frequency generated from the engine. When the damage to the connecting rod bearing is detected, in order to prevent the engine from burning due to degradation of the damage to the connecting rod bearing, a limp-home mode is executed to limit a rotation of the engine within a preset range so that the connecting rod bearing is prevented from being further damaged and a burning phenomenon of the engine is prevented.

When the internal combustion engine vehicle detects the damage to the connecting rod bearing and executes the limp-home mode, the rotation of the engine is limited, the damage to the connecting rod bearing is not further degraded, and thus the internal combustion engine vehicle travels to a safe place at a low speed.

However, even when the hybrid vehicle detects the damage to the connecting rod bearing and limits the rotation of the engine, the drive motor or the HSG drives the engine, and thus there is a problem in that the damage to the connecting rod bearing is degraded and the engine burns. In other words, in a situation in which the engine cannot rotate normally due to the damage to the connecting rod bearing, since the drive motor and the HSG act as an external force to forcibly rotate the engine, the damage to the connecting rod bearing is degraded and the engine is damaged.

This is the same even when the connecting rod bearing in the engine is damaged as well as other bearings necessary for driving the engine.

As described above, when the engine is damaged while traveling, the hybrid vehicle may no longer travel, and when the hybrid vehicle stops while traveling on a road, the stop of the hybrid vehicle may be a cause of an accident.

Meanwhile, a plug-in hybrid vehicle, to which a high voltage battery with a larger capacity than a battery of a general hybrid vehicle is applied in order to increase an available traveling distance using only the drive motor in the hybrid vehicle and which is equipped with a charging device capable of being externally charged, also has the same problem as the hybrid vehicle.

SUMMARY OF PRESENT DISCLOSURE

An embodiment of the present disclosure is directed to an emergency operating system and an emergency operating method for a hybrid vehicle with a damaged bearing of an engine, which prevent a phenomenon in which, when damage to a bearing installed in an engine is detected in a hybrid vehicle, a drive motor or a hybrid starter and generator (HSG) forcibly rotates the engine and allow the hybrid vehicle to travel to a safe place or a place where maintenance may be received in a limp-home mode.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided an emergency operating system for a hybrid vehicle with a damaged bearing of an engine, which includes an engine, a drive motor selectively connected to the engine by a clutch, a hybrid starter and generator (HSG) configured to start the engine or configured to be operated by the engine to generate electric power, and a controller configured to control driving of a hybrid vehicle, wherein, in the emergency operating system of a hybrid vehicle, which controls the hybrid vehicle to be driven even when the bearing installed in the engine is damaged, when damage to the bearing is detected, the controller maintains driving of the engine in a preset limp-home mode, compares whether a state of charge (SOC) of a high voltage battery is greater than or equal to a first reference value which is preset to drive the hybrid vehicle using the engine, and stops the driving of the drive motor and the HSG when the SOC is greater than or equal to the first reference value to control the hybrid vehicle in a first emergency operating mode in which the hybrid vehicle is driven using only a driving force of the engine.

While controlling the hybrid vehicle in the first emergency operating mode, when a current state is any one state among a state in which a gear shift stage of a transmission is a P stage, a state in which the gear shift stage of the transmission is an N stage, and a state in which the hybrid vehicle stops, the controller may control the HSG to generate electric power.

When the SOC is not greater than or equal to the first reference value, the controller may control the hybrid vehicle in a second emergency operating mode in which the clutch is separated, the engine operates the HSG to generate the electric power, and the hybrid vehicle is driven by the drive motor.

The controller may control the engine to be operated at an output that is lower than a maximum output of the limp-home mode and control the engine to operate the HSG to generate the electric power.

After the first emergency operating mode is performed, the controller may compare whether the SOC is lower than or equal to a second reference value which is preset as the need for charging the high voltage battery, and when the SOC is lower than or equal to the second reference value, the controller may control the hybrid vehicle in a second emergency operating mode in which the clutch is separated, the engine operates to allow the HSG to generate the electric power, and the hybrid vehicle is driven by the drive motor.

When the SOC is not lower than or equal to the second reference value, the controller may control the hybrid vehicle in the first emergency operating mode.

The controller may control the engine to be operated at an output that is lower than a maximum output of the limp-home mode and control the engine to operate the HSG to generate the electric power.

After controlling the hybrid vehicle in the second emergency operating mode, the controller may compare whether the SOC is greater than or equal to a third reference value which is preset to drive the hybrid vehicle using the drive motor then drive the hybrid vehicle again using the engine, and when the SOC is greater than or equal to the third reference value, the controller may control to execute the first emergency operating mode again.

When the SOC is not greater than or equal to the third reference value, the controller may control to execute the second emergency operating mode.

The third reference value may be set to be greater than the first reference value.

The controller may monitor the SOC and control the engine, the drive motor, and the HSG according to the SOC.

When the engine is stopped due to the damage to the bearing, the controller may control the engine to not be started.

The controller may drive the drive motor to control the hybrid vehicle to travel from a current location to a safe place.

The bearing may be a bearing installed between a connecting rod and a crankshaft.

In accordance with another embodiment of the present disclosure, there is provided an emergency operating method of a hybrid vehicle with a damaged gearing of an engine, which controls a hybrid vehicle to be driven in an emergency even when a bearing installed in an engine is damaged in the hybrid vehicle which is equipped with an engine and a drive motor, uses at least one of the engine and the drive motor as a driving source, and includes a hybrid starter and generator (HSG) configured to start the engine or configured to be driven by the engine to generate electric power, the emergency operating method including a bearing damage detection operation of detecting and confirming damage to a bearing installed in the engine, an engine driving maintaining operation of maintaining driving of the engine in a preset limp-home mode, a first state of charge (SOC) comparison operation of comparing whether an SOC of a high voltage battery is greater than or equal to a first reference value which is preset to drive the hybrid vehicle by the engine, and when the SOC is greater than or equal to the first reference value, a first emergency operating operation of stopping the drive motor and the HSG and driving the hybrid vehicle using only a driving force of the engine.

When the hybrid vehicle satisfies a predetermined condition in the first emergency operating operation, the HSG may generate the electric power.

In the first emergency operating operation, a condition in which the HSG generates the electric power may be any one state among a state in which a gear shift stage of a transmission is a P stage, a state in which the gear shift stage of the transmission is an N stage, and a state in which the hybrid vehicle stops.

The emergency operating method may further include, after the first emergency operating operation, a second SOC comparison operation of comparing whether the SOC is lower than or equal to a second reference value which is preset as the need for charging the high voltage battery, and when the SOC is lower than or equal to the second reference value in the second SOC comparison operation, a second emergency operating operation of separating a clutch installed between the engine and the drive motor, operating the engine to allow the HSG to generate the electric power, and operating the hybrid vehicle by the drive motor.

When the SOC is not lower than or equal to the second reference value in the second SOC comparison operation, the first emergency operating operation may be performed.

The emergency operating method may further include, when the SOC is not greater than or equal to the first reference value in the first SOC comparison operation, a second emergency operating operation of separating a clutch installed between the engine and the drive motor, operating the engine to allow the HSG to generate the electric power, and operating the hybrid vehicle by the drive motor.

In the second emergency operating operation, the engine may be operated at an output that is lower than the maximum output in the limp-home mode to operate the HSG to generate the electric power.

The emergency operating method may further include, after the second emergency operating operation, a third SOC comparison operation of comparing whether the SOC is greater than or equal to a third reference value which is preset to drive the hybrid vehicle using the drive motor and then drive the hybrid vehicle using the engine again, wherein, when the SOC is greater than or equal to the third reference value in the third SOC comparison operation, the first emergency operating operation is performed again.

The third reference value may be set to be greater than the first reference value.

When the SOC is not greater than or equal to the third reference value in the third SOC comparison operation, the second emergency operating operation may be performed.

The emergency operating method may further include an SOC monitoring start operation of starting monitoring of the SOC between the engine driving maintaining operation and the first SOC comparison operation.

The emergency operating method may further include, after the bearing damage detection operation, an engine stall determination operation of determining whether the engine is stopped, and when it is determined that the engine is stopped, a starting prohibition operation of not starting the engine.

The emergency operating method may further include, after the starting prohibition operation, an emergency traveling operation of driving the drive motor to move the hybrid vehicle from a current location to a safe place.

BRIEF DESCRIPTION OF THE DRAWINGS

FIG. 1 is a block diagram illustrating an emergency operating system for a hybrid vehicle with a damaged bearing of an engine according to the present disclosure.

FIG. 2 is a flowchart illustrating an emergency operating method for a hybrid vehicle with a damaged bearing of an engine according to the present disclosure.

DESCRIPTION OF SPECIFIC EMBODIMENTS

Hereinafter, an emergency operating system and an emergency operating method for a hybrid vehicle with a damaged bearing of an engine according to the present disclosure will be described in detail with reference to the accompanying drawings.

As shown in FIG. 1, a hybrid vehicle 1 drives a drive wheel 43 using either or both of a driving force of an engine 10 and a driving force of a drive motor 20 to travel.

The hybrid vehicle 1 to which the present disclosure is applied may be a hybrid vehicle 1 of a transmission mounted electric device (TMED) type. That is, as shown in FIG. 1, the hybrid vehicle 1 has a structure in which the engine 10 and the drive motor 20 are connected by a clutch 41 and the drive motor 20 is connected to a transmission 42. When the clutch 41 is connected, the engine 10 alone drives the hybrid vehicle 1 or the engine 10 together with the drive motor 20 drives the hybrid vehicle 1, and when the clutch 41 is released (separated), the drive motor 20 alone drives the hybrid vehicle 1.

The engine 10 is always connected to a hybrid starter and generator (HSG) 30 through a belt 44, and thus the HSG 30 drives to start the engine 10 or the engine 10 operates the HSG 30 to generate electric power through the HSG 30.

A high voltage battery 51 is charged with the electric power generated from the HSG 30 or supplies electric power required for driving the drive motor 20.

A controller 60 includes a powertrain control unit (PCU) for controlling the engine 10 and the clutch 41, and a hybrid power control unit (HPCU) for controlling the HSG 30, the drive motor 20, and the transmission 42 in the hybrid vehicle 1. The controller 60 may be a hybrid control unit (HCU) which is the highest controller in the hybrid vehicle 1.

The controller 60 stores an emergency operating method for a hybrid vehicle with a damaged bearing of an engine, which will be described below, as a logic. When damage to the bearing is detected, the controller 60 maintains driving of the engine 10 in a preset limp-home mode and monitors a state of charge (SOC) of the high voltage battery 51 to control the hybrid vehicle 1 to be driven in a first emergency operating mode or a second emergency operating mode according to the SOC of the high voltage battery 51.

In particular, in the present disclosure, when damage to a bearing installed between a connecting rod and a crankshaft among bearings installed in the engine 10 is detected and confirmed, the controller 60 controls the hybrid vehicle 1 to be driven in the limp-home mode.

When the SOC is greater than or equal to a first reference value TH1, the controller 60 stops the driving of the drive motor 20 and the HSG 30 and controls the hybrid vehicle 1 to be driven in the first emergency operating mode in which the hybrid vehicle 1 is driven using only the driving force of the engine 10. The first reference value TH1 may range from 30% to 35%.

On the other hand, while the controller 60 controls the hybrid vehicle 1 to be driven in the first emergency operating mode, when a gear shift stage of the transmission 42 is a P stage, the gear shift stage of the transmission 42 is an N stage, or the hybrid vehicle 1 stops, the controller 60 generates electric power through the HSG 30 to charge the high voltage battery 51. When the gear shift stage of the transmission 42 is in the P stage and the N stage, the driving force of the engine 10 is blocked and not transmitted to the drive wheel 43, and when the hybrid vehicle 1 stops (vehicle speed=zero KPH), the drive wheel 43 is locked by a brake and is not driven, and thus the driving force of the engine 10 does not drive the hybrid vehicle 1 so that the HSG 30 generates the electric power due to the driving force of the engine 10 to charge the high voltage battery 51.

Meanwhile, when the SOC is not greater than or equal to the first reference value TH1, the controller 60 separates the clutch 41, operates the engine 10 to allow the HSG 30 to generate electric power, and controls the hybrid vehicle 1 to be driven in the second emergency operating mode in which the hybrid vehicle 1 is driven using the drive motor 20.

In addition, the controller 60 compares whether the SOC is lower than or equal to a second reference value TH2 which is preset as the need for charging the high voltage battery 51, and when the SOC is lower than or equal to the second reference value TH2 (SOC≤TH2), the controller 60 may control the hybrid vehicle 1 in the second emergency operating mode. Meanwhile, when the SOC is not lower than or equal to the second reference value TH2, the controller 60 controls the hybrid vehicle 1 in the first emergency operating mode. The second reference value TH2 may be set differently from the first reference value TH1 or may be set the same as the first reference value TH1. That is, the second reference value TH2 may be set in the range of 30% to 35%.

In the second emergency operating mode, the controller 60 controls the engine 10 to operate at an output that is lower than an available maximum output in the limp-home mode and controls the HSG 30 to generate electric power.

After controlling the hybrid vehicle 1 in the second emergency operating mode, the controller 60 compares whether the SOC is greater than or equal to a third reference value TH3 which is preset to drive the hybrid vehicle 1 using the drive motor 20 and then drive the hybrid vehicle 1 again using the engine 10. When the SOC is greater than or equal to the third reference value TH3 (SOC≥TH3), the controller 60 controls to execute the first emergency operating mode again. When the SOC is not greater than or equal to the third reference value TH3, the controller 60 controls to execute the second emergency operating mode.

Here, the third reference value TH3 is set to be greater than the first reference value TH1 and may range from 40% to 50%.

Meanwhile, when the engine 10 stops due to damage to the bearing, the controller 60 restricts a starting of the engine 10 to not be attempted again. In a case in which the driving of the engine 10 is not possible due to the damage to the bearing, when the starting of the engine 10 is attempted through the HSG 30, a fire may occur due to slip of the belt 44, and thus the starting of the engine 10 is restricted.

In addition, when the engine 10 stops due to the damage to the bearing, the controller 60 performs emergency traveling of the hybrid vehicle 1 using the drive motor 20 so as to allow the hybrid vehicle 1 to move from a current position to a safe location such as a shoulder, a safety zone, or a location where maintenance is available.

Meanwhile, FIG. 2 illustrates an emergency operating method for a hybrid vehicle with a damaged bearing of an engine according to the present disclosure.

The emergency operating method for a hybrid vehicle with a damaged bearing of an engine according to the present disclosure includes, in the hybrid vehicle 1 which is equipped with the engine 10 and the drive motor 20, uses at least one of the engine 10 and the drive motor 20 as a driving source, and includes the HSG 30 configured to start the engine 10 or configured to be driven by the engine 10 to generate electric power, a bearing damage detection operation S110 of detecting and confirming damage to a bearing installed in the engine 10 in the emergency operating method for a hybrid vehicle for controlling the hybrid vehicle 1 to be driven in an emergency even when the bearing installed in the engine 10 is damaged; an engine driving maintaining operation S120 of maintaining driving of the engine 10 in a preset limp-home mode; a first SOC comparison operation S140 of comparing whether the SOC of the high voltage battery 51 is greater than or equal to the first reference value TH1 which is preset to drive the hybrid vehicle 1 using the engine 10; and a first emergency operating operation S150 of stopping the drive motor 20 and the HSG 30 when the SOC is greater than or equal to the first reference value TH1 and driving the hybrid vehicle 1 using only a driving force of the engine 10.

In the bearing damage detection operation S110, the controller 60 detects and confirms the damage to the bearing installed in the engine 10. The engine 10 is provided with a vibration sensor, such as a knock sensor, which detects a vibration generated when the engine 10 operates, and may detect the damage to the bearing installed in the engine 10 by analyzing a frequency of the vibration measured from the vibration sensor. When the damage to the bearing is consistently detected, the controller 60 confirms the damage to the bearing according to a preset condition.

In particular, in the present disclosure, when damage to a connecting rod bearing, which is a bearing installed between a connecting rod and a crankshaft in the engine 10, is detected and confirmed, the controller 60 controls the hybrid vehicle 1 to be driven in the limp-home mode.

In the engine driving maintaining operation S120, the controller 60 maintains the driving of the engine 10 in a preset limp-home mode. When the engine 10 is restarted from a stationary state, a strong impact is applied to the bearing when compared to the case of continuously maintaining the driving of the engine 10, and thus the damage to the bearing is degraded to result in a state in which the engine 10 is damaged to not be repairable, such as burning. Thus, in a state in which the damage to the bearing is confirmed, the controller 60 maintains the engine 10 being driven in a driving state. In the engine driving maintaining operation S120, the controller 60 operates the engine 10 in the limp-home mode, and thus a speed and an output of the engine 10 are operated below a predetermined level through control of limiting an opening degree amount of a throttle valve.

In an SOC monitoring start operation S130, since the hybrid vehicle 1 with the damaged bearing is differently controlled according to the SOC of the high voltage battery 51, monitoring of the SOC starts.

The SOC monitoring start operation S130 may be performed in an order varied from an order of the engine driving maintaining operation S120.

In the first SOC comparison operation S140, the controller 60 compares whether the SOC is greater than or equal to the first reference value TH1 which is preset to drive the hybrid vehicle 1 using the engine 10. In order to determine whether to drive the hybrid vehicle 1 using the driving force of the engine 10 or the driving force of the drive motor 20, the first SOC comparison operation S140 is performed.

In the first emergency operating operation S150, when the SOC is greater than or equal to the first reference value TH1 (SOC≥TH1), in a state of stopping the drive motor 20 and the HSG 30, the controller 60 drives the hybrid vehicle 1 using only the driving force of the engine 10. When the SOC is greater than or equal to the first reference value TH1, the high voltage battery 51 is not need to be charged and the driving of the engine 10 is in a state of being maintained in the limp-home mode. In addition, when the drive motor 20 and the HSG 30 intervene, the damage to the bearing may be accelerated and thus the engine 10 may be damaged. Accordingly, the drive motor 20 is stopped so as to not generate the driving force, and the HSG 30 is also stopped. Here, the stopping of the HSG 30 includes a case in which the HSG 30 is operated using the driving force of the engine 10 to generate electric power and a case in which the HSG 30 is driven to start the engine 10. Accordingly, in the first emergency operating operation S150, in a state in which the drive motor 20 and the HSG 30 are stopped, the driving force of the engine 10 drives the hybrid vehicle 1. Even when the engine 10 is driven in the limp-home mode, the engine 10 is operable up to an intermediate speed range. When compared with an electric vehicle (EV) mode in which the hybrid vehicle 1 is driven using only the drive motor 20, the hybrid vehicle 1 is driven at a high speed, and thus the driving force of the engine 10 drives the hybrid vehicle 1. In this case, an upper limit of the output of the engine 10 is limited to a range from 30% to 60% of the maximum output thereof. Here, a range of the upper limit of the output of the engine 10 may be varied, as necessary. In addition, the first reference value TH1 may be set in the range of 30% to 35%.

Meanwhile, when a predetermined condition is satisfied in the first emergency operating operation S150, the electric power is generated through the HSG 30. Although the driving force is generated from the engine 10 in the predetermined condition, the driving force in the hybrid vehicle 1 is not transmitted to the drive wheel 43 or the drive wheel 43 is locked by a brake and is not driven, and thus the driving force of the engine 10 operates the HSG 30 and the electric power is generated by the HSG 30. Here, a condition in which the electric power is generated through the HSG 30 may be any one state among a state in which the gear shift stage of the transmission 42 is a P stage, a state in which the gear shift stage of the transmission 42 is an N stage, and a state in which the hybrid vehicle 1 stops. When the gear shift stage of the transmission 42 is in the P stage and the N stage, the driving force of the engine 10 is blocked and not transmitted to the drive wheel 43, and when the hybrid vehicle 1 stops (vehicle speed=zero KPH), the drive wheel 43 is locked by the brake and is not driven. In this case, the HSG 30 generates the electric power due to the driving force of the engine 10 to charge the high voltage battery 51.

In a second SOC comparison operation S160, after the first emergency operating operation S150 is performed, the controller 60 compares whether the SOC is lower than or equal to the second reference value TH2 which is preset as the need for charging the high voltage battery 51.

In the first emergency operating operation S150, although the drive motor 20 is not driven, since the electric power of the high voltage battery 51 is continuously consumed through an air conditioning device and various electric devices of the hybrid vehicle 1, the controller 60 compares whether the SOC is lower than or equal to the second reference value TH2 through the second SOC comparison operation S160.

The second reference value TH2 may be set differently from the first reference value TH1 or may be set the same as the first reference value TH1. That is, the second reference value TH2 may be set in the range of 30% to 35%.

In a second emergency operating operation S170, the clutch 41 installed between the engine 10 and the drive motor 20 is separated, the engine 10 is operated to allow the HSG 30 to generate the electric power, and the drive motor 20 drives the hybrid vehicle 1.

The second emergency operating operation S170 may be performed in the following two cases.

First, when the SOC is lower than or equal to the second reference value TH2 in the second SOC comparison operation S160, the second emergency operating operation S170 is performed.

In addition, when the SOC is not greater than or equal to the first reference value TH1 in the first SOC comparison operation S140, the second emergency operating operation S170 is performed.

In both the two cases, since the SOC is low, the high voltage battery 51 should be charged. Accordingly, the engine 10 is driven due to only the operation of the HSG 30, and thus the HSG 30 charges the high voltage battery 51. In this case, in the second emergency operating operation S170, the engine 10 is operated at an output that is lower than the maximum output in the limp-home mode to allow the HSG 30 to generate the electric power. That is, unlike the operation of the HSG 30 when the hybrid vehicle 1 is normal, the engine 10 is in a minimum operating state for the operation of the HSG 30.

In this case, the traveling of the hybrid vehicle 1 is performed due to only the driving force of the drive motor 20 (the EV mode).

Otherwise, when the SOC is not lower than or equal to the second reference value TH2 in the second SOC comparison operation S160, the first emergency operating operation S150 is repeatedly performed, and when the SOC is sufficient, the hybrid vehicle 1 is driven by the engine 10.

In a third SOC comparison operation S180, the controller 60 compares whether the SOC is greater than or equal to the third reference value TH3 which is preset to drive the hybrid vehicle 1 using the drive motor 20 and then drive the hybrid vehicle 1 again using the engine 10. The third SOC comparison operation S180 is performed after the second emergency operating operation S170.

When the SOC is greater than or equal to the third reference value TH3 (SOC≥TH3) in the third SOC comparison operation S180, the first emergency operating operation S150 is performed.

On the other hand, when the SOC is not greater than or equal to the third reference value TH3 in the third SOC comparison operation S180, the second emergency operating operation S170 is performed again.

Here, the third reference value TH3 is set to be greater than the first reference value TH1. For example, the third reference value TH3 may be set in the range of 40% to 50%.

Meanwhile, in the bearing damage detection operation S110, when the damage to the bearing is confirmed, the following logic is performed together.

When the controller 60 detects and confirms the damage to the bearing, the controller 60 performs an engine stall determination operation S210 of determining whether the engine 10 is stopped. In a state in which the bearing is damaged, it is determined whether the engine 10 is in a stall state in which the starting of the engine 10 is turned off and thus the engine 10 is stopped regardless of intent of the driver and an intention of the controller 60.

In a starting prohibition operation S220, the controller 60 controls the engine 10 of which the starting is turned off to not be restarted. Even when an attempt is made to restart the engine 10 of which the starting is turned off by a manipulation of the driver, the controller 60 does not restart the engine 10. For example, when an accelerator pedal is manipulated in a state in which the hybrid vehicle 1 is traveling in the EV mode, the engine 10 should be restarted so as to allow the hybrid vehicle 1 to be driven at an output corresponding to the manipulation of the accelerator pedal. However, even when the accelerator pedal is manipulated, the controller 60 does not start the engine 10. In addition to a case in which the accelerator pedal is manipulated in the EV mode, when the engine 10 is stopped in a state in which the damage to the bearing is confirmed, the controller 60 does not start the engine 10 even when there is a manipulation to start the engine 10 again.

This is because, when the starting of the engine 10 is attempted again in a state in which the damage to the bearing is detected and the engine 10 is stopped, a fire may occur due to slip of the belt 44 installed between the engine 10 and the HSG 30. For this reason, the controller 60 prevents the engine 10 from being started again.

After the starting prohibition operation S220, it is preferable that an emergency traveling operation S230 of driving the hybrid vehicle 1 from the current location to a safe place is performed. In the emergency traveling operation S230, in a state in which the clutch 41 is released, the hybrid vehicle 1 is driven from the current location to the safe place using only the driving force of the drive motor 20. For example, when the bearing is damaged while the hybrid vehicle 1 is traveling on a road and the engine 10 is stopped, there is a risk of an accident, and thus the hybrid vehicle 1 is driven in the EV mode, that is, is driven using only the driving force of the drive motor 20 so as to allow the hybrid vehicle to move to a safe place such as the shoulder, a safe zone or a location where maintenance is available.

In accordance with an emergency operating system and an emergency operating method for a hybrid vehicle with a damaged bearing of an engine, which include the above described configuration, when a bearing of the engine in the hybrid vehicle is damaged, it is possible to prevent degradation of a state of the engine.

In addition, even when the bearing of the engine is damaged, the hybrid vehicle can be driven to a safe place or a location where maintenance is available.

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. An emergency operating system for a hybrid vehicle, the emergency operating system comprising:
    an engine;
    a drive motor selectively connected to the engine by a clutch;
    a hybrid starter and generator (HSG) configured to start the engine or configured to be operated by the engine to generate electric power; and
    a controller configured to control driving of the hybrid vehicle,
    wherein, in the emergency operating system of the hybrid vehicle, which controls the hybrid vehicle to be driven even when a bearing installed in the engine is damaged, when a damage to the bearing is detected, the controller maintains driving of the engine in a preset limp-home mode, compares whether a state of charge (SOC) of a high voltage battery is greater than or equal to a first reference value which is preset to drive the hybrid vehicle using the engine, and stops driving of the drive motor and the HSG when the SOC is greater than or equal to the first reference value to control the hybrid vehicle in a first emergency operating mode in which the hybrid vehicle is driven using only a driving force of the engine, when the SOC is not greater than or equal to the first reference value, the controller controls the hybrid vehicle in a second emergency operating mode in which the clutch is separated, the engine operates the HSG to generate the electric power, and the hybrid vehicle is driven by the drive motor, and the controller controls the engine to be operated at an output that is lower than a maximum output of the limp-home mode and controls the engine to operate the HSG to generate the electric power.

2. The emergency operating system of claim 1, wherein, while controlling the hybrid vehicle in the first emergency operating mode, when a current state is any one state among a state in which a gear shift stage of a transmission is a P stage, a state in which the gear shift stage of the transmission is an N stage, and a state in which the hybrid vehicle stops, the controller controls the HSG to generate electric power.

3. The emergency operating system of claim 1, wherein, after the first emergency operating mode is performed, the controller compares whether the SOC is lower than or equal to a second reference value which is preset as a need for charging the high voltage battery, and when the SOC is lower than or equal to the second reference value, the controller controls the hybrid vehicle in a second emergency operating mode in which the clutch is separated, the engine is operated to allow the HSG to generate the electric power, and the hybrid vehicle is driven by the drive motor.

4. The emergency operating system of claim 3, wherein, when the SOC is not lower than or equal to the second reference value, the controller controls the hybrid vehicle in the first emergency operating mode.

5. The emergency operating system of claim 3, wherein the controller controls the engine to be operated at an output that is lower than a maximum output in the limp-home mode and controls the engine to operate the HSG to generate the electric power.

6. The emergency operating system of claim 3, wherein, after controlling the hybrid vehicle in the second emergency operating mode, the controller compares whether the SOC is greater than or equal to a third reference value which is preset to drive the hybrid vehicle using the drive motor then drive the hybrid vehicle again using the engine, and when the SOC is greater than or equal to the third reference value, the controller controls to execute the first emergency operating mode again.

7. The emergency operating system of claim 6, wherein, when the SOC is not greater than or equal to the third reference value, the controller controls to execute the second emergency operating mode.

8. The emergency operating system of claim 6, wherein the third reference value is set to be greater than the first reference value.

9. The emergency operating system of claim 1, wherein the controller monitors the SOC and controls the engine, the drive motor, and the HSG according to the SOC.

10. The emergency operating system of claim 1, wherein, when the engine is stopped due to the damage to the bearing, the controller controls the engine to not be started.

11. The emergency operating system of claim 10, wherein the controller drives the drive motor to control the hybrid vehicle to travel from a current location to another place.

12. The emergency operating system of claim 1, wherein the bearing is a bearing installed between a connecting rod and a crankshaft.

13. An emergency operating method of a hybrid vehicle for controlling the hybrid vehicle to be driven in an emergency even when a bearing installed in an engine of the hybrid vehicle is damaged, the hybrid vehicle including the engine and a drive motor, using at least one of the engine or the drive motor as a driving source, and further including a hybrid starter and generator (HSG) configured to start the engine or configured to be driven by the engine to generate electric power, the emergency operating method comprising:

a bearing damage detection operation of detecting and confirming a damage to the bearing installed in the engine;

an engine driving maintaining operation of maintaining driving of the engine in a preset limp-home mode;

a first state of charge (SOC) comparison operation of comparing whether an SOC of a high voltage battery is greater than or equal to a first reference value which is preset to drive the hybrid vehicle by the engine;

when the SOC is greater than or equal to the first reference value, a first emergency operating operation of stopping the drive motor and the HSG and driving the hybrid vehicle using only a driving force of the engine;

a second SOC comparison operation of comparing whether the SOC is lower than or equal to a second reference value which is preset as a need for charging the high voltage battery; and when the SOC is lower than or equal to the second reference value in the second SOC comparison operation, a second emergency operating operation of separating a clutch installed between the engine and the drive motor, operating the engine to allow the HSG to generate the electric power, and operating the hybrid vehicle by the drive motor.

14. The emergency operating method of claim 13, wherein, when the hybrid vehicle satisfies a predetermined condition in the first emergency operating operation, the HSG generates the electric power.

15. The emergency operating method of claim 14, wherein, in the first emergency operating operation, the predetermined condition in which the HSG generates the electric power is any one state among a state in which a gear shift stage of a transmission is a P stage, a state in which the gear shift stage of the transmission is an N stage, and a state in which the hybrid vehicle stops.

16. The emergency operating method of claim 13, wherein, when the SOC is not lower than or equal to the second reference value in the second SOC comparison operation, the first emergency operating operation is performed.

17. The emergency operating method of claim 13, further comprising:

when the SOC is not greater than or equal to the first reference value in the first SOC comparison operation, a second emergency operating operation of separating a clutch installed between the engine and the drive motor, operating the engine to allow the HSG to generate the electric power, and operating the hybrid vehicle by the drive motor.

18. The emergency operating method of claim 17, wherein, in the second emergency operating operation, the engine is operated at an output that is lower than the maximum output in the limp-home mode to operate the HSG to generate the electric power.

19. The emergency operating method of claim 17, further comprising:
after the second emergency operating operation, a third SOC comparison operation of comparing whether the SOC is greater than or equal to a third reference value which is preset to drive the hybrid vehicle using the drive motor and then drive the hybrid vehicle using the engine again,
wherein, when the SOC is greater than or equal to the third reference value in the third SOC comparison operation, the first emergency operating operation is performed again.

20. The emergency operating method of claim 19, wherein the third reference value is set to be greater than the first reference value.

21. The emergency operating method of claim 19, wherein, when the SOC is not greater than or equal to the third reference value in the third SOC comparison operation, the second emergency operating operation is performed.

22. The emergency operating method of claim 13, further comprising:
an SOC monitoring start operation of starting monitoring of the SOC between the engine driving maintaining operation and the first SOC comparison operation.

23. The emergency operating method of claim 13, further comprising:
after the bearing damage detection operation, an engine stall determination operation of determining whether the engine is stopped; and
in response to determining that the engine is stopped, executing a starting prohibition operation of not starting the engine.

24. The emergency operating method of claim 23, further comprising:
after the starting prohibition operation, an emergency traveling operation of driving the drive motor to move the hybrid vehicle from a current location to another place.

* * * * *